United States Patent
Lake

(10) Patent No.: US 10,713,600 B2
(45) Date of Patent: *Jul. 14, 2020

(54) DETERMINING SOFTWARE COMPLEXITY

(71) Applicant: International Business Machines Corporation, Armonk, NY (US)

(72) Inventor: John Michael Lake, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 48 days.

This patent is subject to a terminal disclaimer.

(21) Appl. No.: 14/953,557

(22) Filed: Nov. 30, 2015

(65) Prior Publication Data

US 2016/0077829 A1    Mar. 17, 2016

Related U.S. Application Data

(63) Continuation of application No. 14/529,958, filed on Oct. 31, 2014, now Pat. No. 9,299,045, which is a continuation of application No. 11/853,017, filed on Sep. 10, 2007, now Pat. No. 8,881,091, which is a continuation of application No. 10/801,369, filed on Mar. 16, 2004, now Pat. No. 7,739,652.

(51) Int. Cl.

| | |
|---|---|
| *G06F 9/44* | (2018.01) |
| *G06Q 10/06* | (2012.01) |
| *G06F 8/77* | (2018.01) |
| *G06F 40/146* | (2020.01) |
| *G06F 40/197* | (2020.01) |
| *G06F 8/71* | (2018.01) |

(52) U.S. Cl.
CPC .............. *G06Q 10/06* (2013.01); *G06F 8/71* (2013.01); *G06F 8/77* (2013.01); *G06F 40/146* (2020.01); *G06F 40/197* (2020.01)

(58) Field of Classification Search
CPC ...... G06F 8/70; G06F 8/71; G06F 8/77; G06F 17/2228; G06F 17/2252; G06F 40/146; G06F 40/197; G06Q 10/06
USPC ................................ 717/101–105, 120–122
See application file for complete search history.

(56) References Cited

U.S. PATENT DOCUMENTS

| | | | |
|---|---|---|---|
| 4,558,413 | A | 12/1985 | Schmidt et al. |
| 4,809,170 | A | 2/1989 | Leblang et al. |
| 5,649,200 | A | 7/1997 | Leblang et al. |
| 5,659,735 | A | 8/1997 | Parrish et al. |
| 5,729,745 | A | 3/1998 | Leonard |
| 5,729,746 | A | 3/1998 | Leonard |
| 5,960,196 | A | 9/1999 | Carrier, III et al. |
| 6,223,343 | B1 | 4/2001 | Hopwood et al. |
| 6,343,297 | B1 | 1/2002 | D'Anjou et al. |
| 6,397,202 | B1 | 5/2002 | Higgins et al. |

(Continued)

OTHER PUBLICATIONS

Jan Heering, "Quantification of Structural Information: On a Question Raised by Brooks", 2003, ACM, pp. 1-2.*

(Continued)

*Primary Examiner* — Ted T. Vo
(74) *Attorney, Agent, or Firm* — Scott S. Dobson

(57) ABSTRACT

Methods, apparatus, and computer program products for determining software complexity. A plurality of versions of a software module whose complexity is to be determined are compressed. Lengths of the compressed versions are compared, one with another, to provide complexity metrics.

18 Claims, 2 Drawing Sheets

(56) References Cited

U.S. PATENT DOCUMENTS

| | | | |
|---|---|---|---|
| 6,496,974 | B1 | 12/2002 | Sliger et al. |
| 6,542,907 | B1 | 4/2003 | Cohen |
| 6,658,643 | B1 | 12/2003 | Bera |
| 6,681,382 | B1 | 1/2004 | Kakumani et al. |
| 6,715,108 | B1 | 3/2004 | Badger et al. |
| 6,938,109 | B1 | 8/2005 | Sliger et al. |
| 6,981,245 | B1 | 12/2005 | Schwabe |
| 6,986,132 | B1 | 1/2006 | Schwabe |
| 7,047,257 | B2 | 5/2006 | Fletcher et al. |
| 7,069,541 | B2 | 6/2006 | Dougherty et al. |
| 7,146,608 | B1 | 12/2006 | Newman et al. |
| 7,739,652 | B2 | 6/2010 | Lake |
| 8,881,091 | B2 | 11/2014 | Lake |
| 9,299,045 | B2 * | 3/2016 | Lake .............. G06Q 10/06 |
| 2008/0005720 | A1 | 1/2008 | Lake |

OTHER PUBLICATIONS

Julian Seward, "bzip2 and libbzip2", 1998, downloaded from https://stuff.mit.edu/, 38 pages.*

Wikipedia, "Programming complexity", May 2019, retreived from https://en.wikipedia.org/wiki/Programming_complexity, 3 pages (Year: 2019).*

Techopedia, "File Compression", 2019, retrieved from https://www.techopedia.com/definition/892/file-compression, 1 page (Year: 2019).*

Non-Final Office Action for U.S. Appl. No. 11/853,017, dated Feb. 14, 2012, 10 pages, U.S. Patent and Trademark Office.

Non-Final Office Action for U.S. Appl. No. 11/853,017, dated Jul. 17, 2012, 10 pages, U.S. Patent and Trademark Office.

Final Office Action for U.S. Appl. No. 11/853,017, dated Dec. 31, 2012, 8 pages, U.S. Patent and Trademark Office.

Non-Final Office Action for U.S. Appl. No. 11/853,017, dated Sep. 12, 2013, 8 pages, U.S. Patent and Trademark Office.

Final Office Action for U.S. Appl. No. 11/853,017, dated Apr. 8, 2014, 12 pages, U.S. Patent and Trademark Office.

Notice of Allowance Action for U.S. Appl. No. 11/853,017, dated Jul. 3, 2014, 10 pges, U.S. Patent and Trademark Office.

Non-Final Office Action for U.S. Appl. No. 10/801,369, dated May 22, 2007, 12 pages, U.S. Patent and Trademark Office.

Non-Final Office Action for U.S. Appl. No. 10/801,369, dated Sep. 25, 2007, 9 pages, U.S. Patent and Trademark Office.

Final Office Action for U.S. Appl. No. 10/801,369, dated Feb. 6, 2008, 7 pages, U.S. Patent and Trademark Office.

Non-Final Office Action for U.S. Appl. No. 10/801,369, dated Aug. 6, 2008, 9 pages, U.S. Patent and Trademark Office.

Final Office Action for U.S. Appl. No. 10/801,369, dated Jan. 6, 2009, 9 pages, U.S. Patent and Trademark Office.

Ex Parte Quayle Action for U.S. Appl. No. 10/801,369, dated Sep. 11, 2009, 4 pages, U.S. Patent and Trademark Office.

Notice of Allowance Action for U.S. Appl. No. 10/801,369, dated Feb. 5, 2010, 4 pages, U.S. Patent and Trademark Office.

Curtis et al., "Measuring the Psychological Complexity of Software Maintenance Tasks with the Halstead and McCabe Metrics", Mar. 1979, IEEE Transactions on Software Engineering, vol. SE-5, No. 2, pp. 96-104.

Araujo et al., "Code Compression Based on Operand Factorization", 1998, IEEE , pp. 194-201.

Chen, "A Code Size Optimization Using Procedural Abstraction" Jul. 2003, Master Thesis, http://whale.csie.ndhu.edu.tw/publications_download/etd-0711103-010132.pdf, pp. 1-74.

Evans et al., "Kolmogorov Complexity Estimation and Analysis", Oct. 2002, GE Global Research, pp. 1-6.

Cardoso et al., "Two Different Views about Software Complexity", 2000, CiteSeerX, pp. 433-438.

Chaitin, G., "A Theory of Program Size Formally Identical to Information Theory", Journal of the ACM 22, pp. 329-340. 1975.

Campani, C., "Characterizing the Software Development Process: A New Approach Based on Kolmogorov Complexity", Feb. 2, 2004.

Non-Final Office Action for U.S. Appl. No. 14/529,958, dated Mar. 3, 2015, 15 pages, U.S. Patent and Trademark Office.

Notice of Allowance Action for U.S. Appl. No. 14/529,958, dated Aug. 19, 2015, 6 pages, U.S. Patent and Trademark Office.

* cited by examiner

DETERMINING SOFTWARE COMPLEXITY

CROSS-REFERENCE TO RELATED APPLICATIONS

This application is a continuation of U.S. patent application Ser. No. 14/529,958 filed on Oct. 31, 2014, which is a continuation of U.S. patent application Ser. No. 11/853,017 filed on Sep. 10, 2007, issued as U.S. Pat. No. 8,881,091, which is a continuation of U.S. patent application Ser. No. 10/801,369 filed on Mar. 16, 2004, and issued as U.S. Pat. No. 7,739,652.

FIELD OF THE INVENTION

The invention relates to the field of software engineering, and more particularly to methods, apparatus, and computer program products for determining software complexity.

BACKGROUND

Software has become increasingly complex as processor capability, memory density, and users' expectations have grown. As a result, methods and tools for managing software development projects have become increasingly important, including methods for determining software complexity to be used in estimating, for example, how many defects are expected to occur in a software component, how many hours of development time are expected to be needed for the completion of a project, and so forth.

Today, such estimates are normally based on counts of lines of code, together with some simple rules for determining what, roughly, constitutes a line of code. For example, a certain development time and a specified number of defects may be expected per thousand lines of code. This method may be called generically the KLOC method.

The KLOC method, while certainly useful, has significant drawbacks. These drawbacks are a product of the highly variable nature of software components. Some components are rich in unique code, whereas other components include substantial repetitions, spaces, blank lines, comments, and so forth. Thus, when two software components are compared using the KLOC method, where one component is rich in unique code while the other is highly repetitive and full of comments, the resulting estimates will be inconsistent. The two estimates might be numerically the same, for example, whereas in reality the software that is rich in unique code is rationally expected to be more difficult to develop, and therefore to require more development time and be more susceptible to defects. Furthermore, the KLOC method is strongly tied to the properties of the particular programming language in question, as some languages are inherently more dense than others.

Thus, there is a need for a language-independent way to determine software complexity consistently, so that software project estimates such as expected development time, expected numbers of defects, and so forth, may be determined more accurately than is possible today.

SUMMARY

Embodiments of the invention include methods, apparatus, and computer program products for determining software complexity. A plurality of versions of a software module whose complexity is to be determined are compressed. Lengths of the compressed versions are compared, one with another, to provide complexity metrics.

DETAILED DESCRIPTION

The present invention includes language-independent methods, apparatus, and computer program products for determining software complexity more accurately and consistently than is possible using the KLOC method.

Measures are taken of a plurality of different forms of a software component whose complexity is to be determined, and the measures are then compared with one another to reveal characteristics of the software component that are otherwise obscured. More particularly, a plurality of versions of the software are determined, each of the versions is compressed, and the lengths of the compressed versions are compared with each other to provide software complexity metrics.

As an aid to understanding the invention, let an exemplary software module M be constructed from three strings, which are called here p, p', and p". Let K(x) be the KLOC measure of the complexity of string x. The complexity of the module M would then be the sum of the lengths of the three strings, i.e., $K(M)=K(p)+K(p')+K(p'')$.

Suppose, however, that the strings are not independent, but rather that p' is dependent upon p, i.e., $p'=f(p)$, and p" is dependent upon p and p', i.e., $p''=g(p, f(p))$. When f(.) and g(.) are relatively simple functions, for example substitutions of identifiers, it is more reasonable and more useful for purposes such as estimating the number of defects in the module, to take into account conditional dependencies to represent the incremental contributions of p' and p". Thus, a complexity measure according to the present invention, which is called here C(M), may be described in terms of the complexity of p, of p' given p, and of p" given p and p', i.e., $C(M)=C(p)+C(p'|p)+C(p''|p,p')$.

Figure 1:
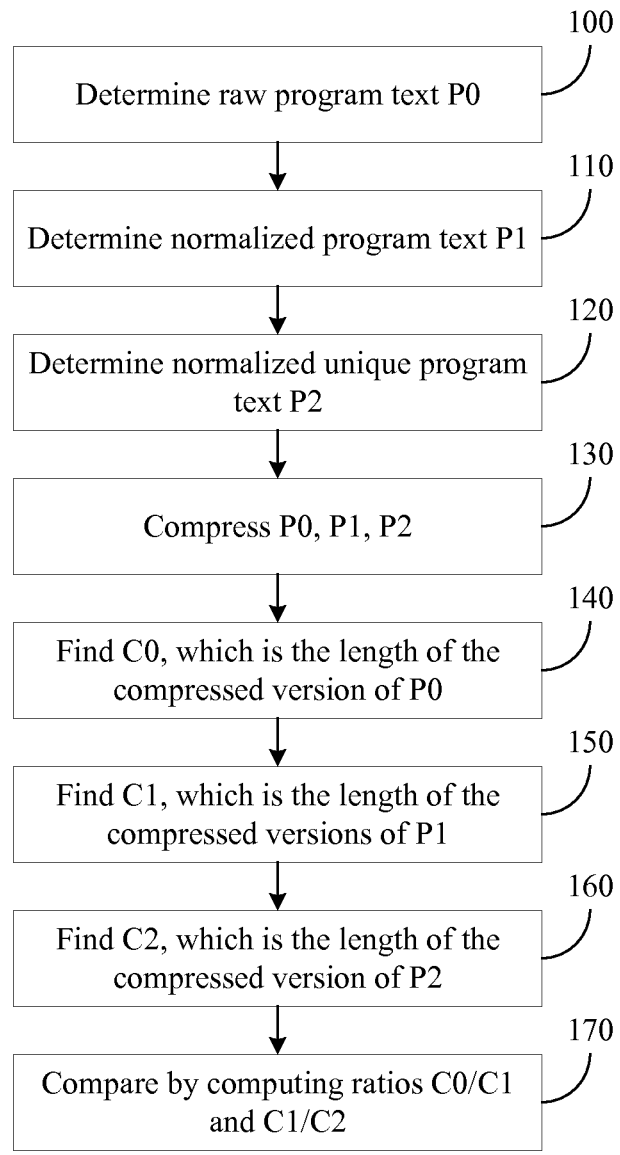
FIG. 1 is a flowchart that illustrates an exemplary method for providing program complexity metrics according to the present invention.

Turning now to a preferred embodiment of the invention, which may be understood in the theoretical context just described and with reference to FIG. 1, let P0 be the raw program text of, let P1 be the normalized program text of P, and let P2 be the normalized unique program text of P. Here, the raw text P0 is found by collecting the program files of P into one file. In a preferred embodiment of the invention, the normalized program text P1 is found by eliminating comments from P0, normalizing sequences of spaces into a single space, and then sorting the remaining lines into lexicographic order. This way of normalizing the program text is merely illustrative of the invention rather than limiting, however, as there are many other ways to normalize, all of which fall within the scope of the invention. In another exemplary embodiment, the normalized program text P1 may be found by reformatting the program text P0 according to a stylistic standard, so that minor differences in formatting style are removed. This approach may be especially useful when the software in question has a long life, as style fashions tend to evolve over time. The normalized unique program text P2 may be found by eliminating duplicate lines in P1.

Operations of a corresponding method are shown in FIG. 1. From P, the raw program text P0 is determined (step 100), the normalized program text P1 is determined (step 110), and the normalized unique program text P2 is determined (step 120), all as just described.

Texts P0, P1, and P2 are then compressed (step 130). In a preferred embodiment of the invention, compression is provided by application of the open source bzip2 program, for example version 1.0.1 of bzip2. The use of this particular compression algorithm is merely illustrative of the invention rather than limiting. The bzip2 compression method, which relies on a block sorting algorithm and numeric coding, is well known to those skilled in the art, and therefore will not be described in detail here. Further information regarding bzip2 may be found on the World Wide Web at, for example, Uniform Resource Locator digistar.com/bzip2/.

Measures C0, C1, and C2 are then found from the compressed versions of P0, P1, and P2, respectively (steps 140, 150, 160). Measure C0 is the length of the compressed version of P0. Measure C1 is the length of the compressed version of P1. Measure C2 is the length of the compressed version of P2. The resulting measures C0, C1, and C2 are compared by computing the ratios C0/C1 and C1/C2 (step 170).

Measure C0, which results from compression of the raw program text, may be used rather than a KLOC count in estimates of expected development times and expected numbers of defects. Measures C1 and C2 address the question of incremental contributions. Thus, the ratios C0/C1 and C1/C2 are proportional to the redundancy of the implementation of P and the propagation of defects, respectively, and may be used as metrics of these attributes.

Figure 2:
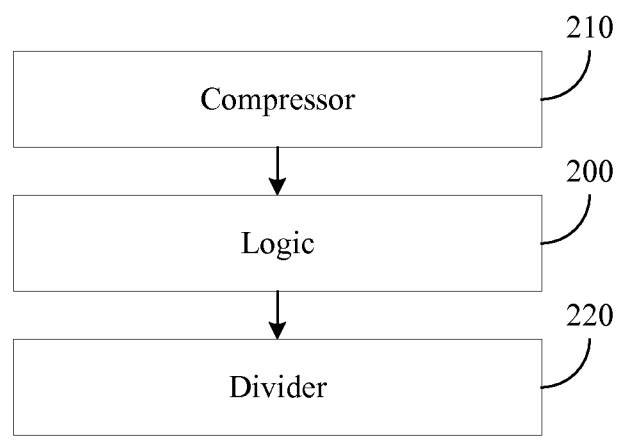
FIG. 2 is an illustrative embodiment of apparatus according to the present invention.

As shown in FIG. 2, apparatus according to the present invention includes logic 200, which may itself include memory (not shown), a compressor 210, and a divider 220. These elements are shown as separate in FIG. 2 only for descriptive convenience. All may be implemented using a stored-program-control processor, such as a microprocessor.

The logic 200 determines the raw program text P0, the normalized program text P1, and the normalized unique program text P2 as described above. The compressor 210 compresses the texts P0, P1, and P2. In a preferred embodiment, the compressor uses release 1.0.1 of bzip2. The logic 200 determines the measures C0, C1, and C2, which are, respectively, the lengths of the compressed versions of P0, P1, and P2. The divider 220 computes the ratios C0/C1 and C1/C2.

Embodiments of the invention further include program storage devices readable by machines, tangibly embodying programs of instructions suitable for implementing the methods described above and for controlling processor implementations of the apparatus described above.

Thus, as described above, the present invention provides language-independent methods, apparatus, and computer program products for determining software complexity metrics that are more accurate and consistent than measures based upon the KLOC method. The foregoing description of the invention is illustrative rather than limiting, however, and the invention is limited in its scope only by the claims appended here.

I claim:

1. A method comprising:
   creating, by a processor, a plurality of versions of a software component, wherein a first version of the plurality of versions is determined from a second version of the plurality of versions;
   compressing, by the processor, each of the plurality of versions to provide a compressed version corresponding to each of the plurality of versions;
   determining, by the processor, a length of each of the compressed versions;
   calculating, by the processor, a software complexity metric based on a ratio between the lengths of at least two of the compressed versions, wherein the ratio includes a length ratio between the length of the compressed version of the second version and the length of the compressed version of the first version; and
   using, by the processor, the software complexity metric to determine complexity of the software component, wherein the complexity of the software component is determined from the length ratio.

2. The method of claim 1, further including:
   creating, by the processor, a raw program text version of the software component and a normalized program text version of the software component from the raw program text version;
   compressing, by the processor, the raw program text version to provide a compressed raw program text version and the normalized program text version to provide a compressed normalized program text version;
   determining, by the processor, a length of the compressed raw program text version and a length of the compressed normalized program text version;
   calculating, by the processor, a ratio of the length of the compressed raw program text version to the length of the compressed normalized program text version; and
   using, by the processor, a software complexity metric based at least on the ratio of the length of the compressed raw program text version to the length of the compressed normalized program text version to determine the complexity of the software component.

3. The method of claim 2, further including collecting, by the processor, program files into one file to create the raw program text version.

4. The method of claim 2, further creating the normalized program text version by:
   eliminating comments from raw program text of the raw program text version;
   normalizing sequences of spaces into a single space in the raw program text; and
   after the eliminating and normalizing, sorting remaining lines into lexicographic order in the raw program text to create the normalized program text version.

5. The method of claim 2, further including:
   reformatting, by the processor, the raw program text version according to a stylistic standard to remove a difference in a formatting style; and
   creating, by the processor, the normalized program text version.

6. The method of claim 1, further including:
   creating, by the processor, a normalized program text version of the software component and a normalized unique program text version of the software component from the normalized program text version;
   compressing, by the processor, the normalized program text version to provide a compressed normalized program text version and the normalized unique program text version to provide a compressed normalized unique program text version;
   determining, by the processor, a length of the compressed normalized program text version and a length of the compressed normalized unique program text version;

calculating, by the processor, a ratio of the length of the compressed normalized program text version to the length of the compressed normalized unique program text version; and using, by the processor, the ratio of the length of the compressed normalized program text version to the length of the compressed normalized unique program text version to determine the complexity of the software component.

7. The method of claim 6, further including eliminating, by the processor, duplicate lines in the normalized program text version to create the normalized unique program text version.

8. The method of claim 1, wherein a subsequent version of the plurality of versions depends on a preceding version of the plurality of versions.

9. The method of claim 1, wherein a subsequent version of the plurality of versions removes a feature of a preceding version of the plurality of versions.

10. The method of claim 9, wherein the feature includes one or more of a comment, a difference in formatting style, and a duplicate line.

11. The method of claim 1, further including implementing, by the processor, a block sorting compressor to compress each of the plurality of versions.

12. The method of claim 11, wherein the block sorting compressor includes a bzip2 compressor.

13. The method of claim 1, wherein:
a third version of the plurality of versions is determined from the first version; and
the calculating is further based upon a ratio between the length of the compressed version of the first version and the length of the compressed version of the third version.

14. The method of claim 1, wherein the compressing is based on a block sorting algorithm and numeric coding.

15. A method comprising:
creating, by a processor, a raw program text version of a software component and a normalized program text version of the software component from the raw program text version, the creating the normalized program text version includes removing comments from the raw program text version, normalizing sequences of spaces of the raw program text version into a single space, and then sorting the remaining lines from the raw program text version into lexicographic order to create the normalized program text version;

compressing, by the processor, the raw program text version to provide a compressed raw program text version and the normalized program text version to provide a compressed normalized program text version;

determining, by the processor, a length of the compressed raw program text version and a length of the compressed normalized program text version;

calculating, by the processor, a ratio of the length of the compressed raw program text version to the length of the compressed normalized program text version; and using, by the processor, a software complexity metric based at least on the ratio of the length of the compressed raw program text version to the length of the compressed normalized program text version to determine a complexity of the software component.

16. The method of claim 15, wherein the compressing is based on a block sorting algorithm and numeric coding.

17. A method comprising:
creating, by a processor, a normalized program text version of a software component and a normalized unique program text version of the software component from the normalized program text version by eliminating duplicate lines in the normalized program text version;

compressing, by the processor, the normalized program text version to provide a compressed normalized program text version and the normalized unique program text version to provide a compressed normalized unique program text version;

determining, by the processor, a length of the compressed normalized program text version and a length of the compressed normalized unique program text version;

calculating, by the processor, a ratio of the length of the compressed normalized program text version to the length of the compressed normalized unique program text version; and using, by the processor, the ratio of the length of the compressed normalized program text version to the length of the compressed normalized unique program text version to determine a complexity of the software component.

18. The method of claim 17, wherein the compressing is based on a block sorting algorithm and numeric coding.

* * * * *